United States Patent
Garrard

(10) Patent No.: US 8,935,077 B2
(45) Date of Patent: Jan. 13, 2015

(54) CONTROLLING AN ENGINE HAVING AN ELECTRONICALLY-CONTROLLED TURBOCHARGER

(75) Inventor: Tyler Garrard, Buellton, CA (US)

(73) Assignee: EcoMotors, Inc., Allen Park, MI (US)

( * ) Notice: Subject to any disclaimer, the term of this patent is extended or adjusted under 35 U.S.C. 154(b) by 383 days.

(21) Appl. No.: 13/344,879

(22) Filed: Jan. 6, 2012

(65) Prior Publication Data

US 2012/0191322 A1 Jul. 26, 2012

Related U.S. Application Data

(60) Provisional application No. 61/434,456, filed on Jan. 20, 2011.

(51) Int. Cl.

| F02B 37/12 | (2006.01) |
|---|---|
| F02D 23/00 | (2006.01) |
| F02B 37/10 | (2006.01) |
| F01M 1/20 | (2006.01) |
| F02B 39/10 | (2006.01) |
| F02B 39/14 | (2006.01) |
| F02N 11/08 | (2006.01) |
| F01M 9/10 | (2006.01) |

(Continued)

(52) U.S. Cl.
CPC ............... F02D 23/00 (2013.01); F02B 37/10 (2013.01); F01M 1/20 (2013.01); F02B 39/10 (2013.01); F02B 39/14 (2013.01); F02N 11/0803 (2013.01); F02D 41/0007 (2013.01); F02N 11/10 (2013.01); F02N 2200/025 (2013.01); Y02T 10/144 (2013.01)
USPC ............ 701/103; 123/565; 60/598; 60/605.3; 60/607; 60/606

(58) Field of Classification Search
CPC . F01M 1/16; F01M 2001/0215; F01M 5/025; F02D 25/18; F02D 41/042; F02N 11/08; F02B 39/10; F02B 39/14; F02B 37/10
USPC ................ 123/565, 179.4, 196, 179.3, 179.8, 123/179.9, 179.28, 559.1; 60/605.3, 598, 60/608, 607; 701/101, 103, 112, 113; 184/6.3; 415/1

See application file for complete search history.

(56) References Cited

U.S. PATENT DOCUMENTS 2,102,514 A * 12/1937 Clarkson ........................ 184/6.3
2,178,756 A * 11/1939 Joost ........................ 123/196 S (Continued)

FOREIGN PATENT DOCUMENTS

| DE | 10306036 | * | 9/2004 | .............. F01D 25/20 |
| DE | 10306036 A1 | * | 9/2004 | .............. F01D 25/20 |

(Continued)

*Primary Examiner* — Lindsay Low
*Assistant Examiner* — Brian Kirby
(74) *Attorney, Agent, or Firm* — Diana D. Brehob

(57) ABSTRACT

A procedure for startup and shutdown of an internal combustion engine with an electronically-controlled turbocharger (ECT) is disclosed. The startup and shutdown procedures are determined to provide the desired lubrication to engine and ECT components and sufficient cooling of the engine and ECT. In one embodiment, the system includes an electric oil pump that can supply oil to the oil circuit in the engine and ECT independently of an engine-driven mechanical oil pump. In another embodiment, the oil circuit is provided with an oil accumulator to provide oil for cooling after engine rotation has stopped.

17 Claims, 3 Drawing Sheets

(51) Int. Cl.
*F02D 41/00* (2006.01)
*F02N 11/10* (2006.01)

(56) References Cited

U.S. PATENT DOCUMENTS

| | | | | |
|---|---|---|---|---|
| 2,751,749 A | * | 6/1956 | Newcomb | 60/39.08 |
| 2,838,039 A | * | 6/1958 | Smith et al. | 123/196 S |
| 3,043,092 A | * | 7/1962 | Addie et al. | 60/605.3 |
| 3,203,514 A | * | 8/1965 | Davies et al. | 188/170 |
| 3,575,264 A | * | 4/1971 | Johnson et al. | 184/6 |
| 3,676,999 A | * | 7/1972 | Oldfield | 60/606 |
| 3,827,236 A | * | 8/1974 | Rust | 60/605.1 |
| 4,422,295 A | * | 12/1983 | Minami et al. | 60/605.3 |
| 4,446,377 A | * | 5/1984 | Kure-Jensen et al. | 290/52 |
| 4,458,644 A | * | 7/1984 | Papst | 123/196 S |
| 4,475,493 A | * | 10/1984 | Masteller et al. | 123/179.3 |
| 4,628,877 A | * | 12/1986 | Sundles et al. | 123/196 S |
| 4,629,033 A | * | 12/1986 | Moore et al. | 184/6.3 |
| 4,884,406 A | * | 12/1989 | Kawamura | 60/605.3 |
| 4,893,598 A | * | 1/1990 | Stasiuk | 123/196 S |
| 4,940,114 A | * | 7/1990 | Albrecht | 184/6.3 |
| 4,977,743 A | * | 12/1990 | Aihara et al. | 60/605.3 |
| 4,981,017 A | * | 1/1991 | Hara et al. | 60/608 |
| 5,000,143 A | * | 3/1991 | Brown | 123/196 S |
| 5,195,476 A | * | 3/1993 | Schwarz | 123/179.5 |
| 5,560,208 A | * | 10/1996 | Halimi et al. | 60/608 |
| 5,906,098 A | * | 5/1999 | Woollenweber et al. | 60/608 |
| 6,338,323 B1 | * | 1/2002 | Machida | 123/90.17 |
| 6,481,978 B2 | | 11/2002 | Zamalis et al. | 417/228 |
| 6,557,521 B2 | * | 5/2003 | Ichihara et al. | 123/299 |
| 6,604,360 B1 | | 8/2003 | Vuk | |
| 6,705,084 B2 | | 3/2004 | Allen et al. | |
| 6,871,499 B1 | * | 3/2005 | Allen et al. | 60/608 |
| 7,007,654 B2 | * | 3/2006 | Aliev | 123/196 S |
| 7,055,486 B2 | * | 6/2006 | Hoff et al. | 123/196 R |
| 7,076,955 B2 | | 7/2006 | Herz et al. | |
| 7,114,482 B2 | * | 10/2006 | Lane | 123/196 R |
| 7,137,253 B2 | * | 11/2006 | Furman et al. | 60/608 |
| 7,946,118 B2 | * | 5/2011 | Hippen et al. | 60/605.3 |
| 8,447,501 B2 | * | 5/2013 | Gamberoni et al. | 701/110 |
| 8,606,446 B2 | * | 12/2013 | Ito et al. | 701/22 |
| 2006/0120876 A1 | * | 6/2006 | Kitano et al. | 417/42 |
| 2008/0053091 A1 | | 3/2008 | Barthelet | |
| 2008/0173017 A1 | | 7/2008 | St. James | |
| 2008/0283337 A1 | * | 11/2008 | Theobald | 184/6.1 |
| 2009/0000592 A1 | * | 1/2009 | Luft et al. | 123/196 R |
| 2009/0151314 A1 | | 6/2009 | Tumelty et al. | |
| 2009/0298644 A1 | * | 12/2009 | Nihei et al. | 477/107 |
| 2010/0107632 A1 | | 5/2010 | Wu et al. | |
| 2010/0132365 A1 | * | 6/2010 | Labala | 60/776 |
| 2010/0175377 A1 | | 7/2010 | Hippen et al. | |
| 2010/0281863 A1 | | 11/2010 | Shiraishi | |
| 2010/0284824 A1 | | 11/2010 | Hippen et al. | |
| 2012/0123666 A1 | * | 5/2012 | Stoffels et al. | 701/113 |
| 2013/0074795 A1 | * | 3/2013 | Michel et al. | 123/179.4 |

FOREIGN PATENT DOCUMENTS

| | | | |
|---|---|---|---|
| JP | 08082220 A | | 3/1996 |
| JP | 2003269203 A | * | 9/2003 ............. F02D 23/00 |
| JP | 2008223626 A | * | 9/2008 |
| WO | 2010081123 A | | 7/2010 |

* cited by examiner

CONTROLLING AN ENGINE HAVING AN ELECTRONICALLY-CONTROLLED TURBOCHARGER

The present application claims priority benefit from U.S. provisional patent application 61/434,456 filed Jan. 20, 2011.

FIELD

The present disclosure relates to starting up and shutting down an engine with an electronically-controlled turbocharger.

BACKGROUND

An engine may be provided with an electronically-control turbocharger (ECT) to overcome turbocharger lag and/or to provide greater boosting than is possible with a conventional turbocharger. An ECT may also act as a waste heat recovery device extracting excess energy from the exhaust gas and repurposing it to pass energy to the crankshaft or store the energy. An ECT may particularly benefit a two-stroke engine that suffers from insufficient exhaust enthalpy to provide the desired boost level at some operating conditions. Special provisions for cooling and lubricating the ECT may be provided, including an auxiliary oil pump and/or a coolant pump that is electrically driven. It is desirable to control the engine/ECT system so as to properly protect the engine and ECT during stopping and starting.

SUMMARY

A method and a system to startup and shutdown an engine with an ECT are disclosed. An engine configured with an ECT includes a spark-ignition or compression-ignition engine with a starter motor coupled to the engine, an ECT, which includes: a compressor supplying pressurized air to an engine intake, a turbine disposed in an engine exhaust for accepting engine exhaust gases, a shaft coupling the turbine and the compressor, and an electric motor coupled to the shaft. In some embodiments, an oil circuit of the engine and the ECT is provided with an electric oil pump. An electronic control unit (ECU) is electronically coupled to the engine, the starter motor, the electric motor, and the electric oil pump. The ECU commands current to be applied to the electric oil pump in response to a command for startup. The ECU commands current to the ECT and current to the starter motor based on oil pressure in the oil circuit being sufficient. The ECU further initiates combustion in the engine. The ECU discontinues current supply to the electric oil pump in response to combustion being established in the engine. Upon receipt of a command for engine shutdown, the ECU commands current to the electric oil pump while the temperature in the engine and/or the ECT are estimated to be above a threshold temperature.

In an embodiment with an electric oil pump, a startup procedure includes: applying current to an electric oil pump supplying oil to an oil circuit of the engine and the ECT, applying current to the ECT when oil pressure in the oil circuit is estimated to exceed a first threshold pressure, applying current to a starter motor coupled to the engine when oil pressure in the oil circuit is estimated to exceed a second threshold pressure, and initiating fuel injection to the engine in response to a determination that at least one condition is appropriate for engine combustion. The first and second threshold pressures are substantially the same in one embodiment. However, even so, it may be advantageous to start them sequentially so as to avoid drawing too much current at once. In another embodiment, the first threshold pressure is lower than the second threshold pressure so that the ECT starts up before the engine. In yet another embodiment, the engine spin up precedes the ECT spin up when the first threshold pressure is greater than the second threshold pressure. The appropriate condition for initiating combustion in the engine may be one or more of: pressure in an intake of the engine exceeding a predetermined pressure, a speed of the ECT exceeding a predetermined speed, and speed of the engine exceeding a speed of the engine.

After combustion has been initiated in the engine, current supply to the electric oil pump is discontinued. In an alternative embodiment, the current supply is discontinued based on engine speed exceeding a threshold speed.

Current is applied to the electric oil pump in response to receipt of a command to a startup command, the startup command coming from an operator of the vehicle such as through an ignition switch or through a command from an electronic controller associated with a start-stop vehicle or a hybrid electric vehicle.

If a shutdown command is received, the engine is commanded to idle and the ECT is commanded to a minimum ECT speed. Current is applied to the electric oil pump when the engine substantially attains idle speed and the ECT substantially attains the minimum speed.

According to an alternative startup procedure in an engine without an electric pump, in response to a startup command: current is applied to a starter motor coupled to the engine in response to a receipt of a startup command, current is applied to the ECT when oil pressure at the ECT is estimated to exceed a threshold pressure, and combustion is initiated in the engine in response to a determination that at least one condition is appropriate for engine combustion. In a compression-ignition engine embodiment, combustion is commanded by initiating fuel injection in the engine. In spark-ignition embodiment, combusting is commanded by initiating fuel injection and initiating spark ignition.

In some embodiments, an oil circuit coupled to the engine and ECT has an accumulator with a valve provided between the oil circuit and the accumulator. In such embodiments, the valve is commanded to open during normal engine operation to charge the accumulator and the valve is closed after the accumulator has been charged.

Upon receipt of a shutdown command, the engine is commanded to shutdown and current supply to the ECT is discontinued. After the engine is shutdown, the valve proximate the accumulator is opened.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
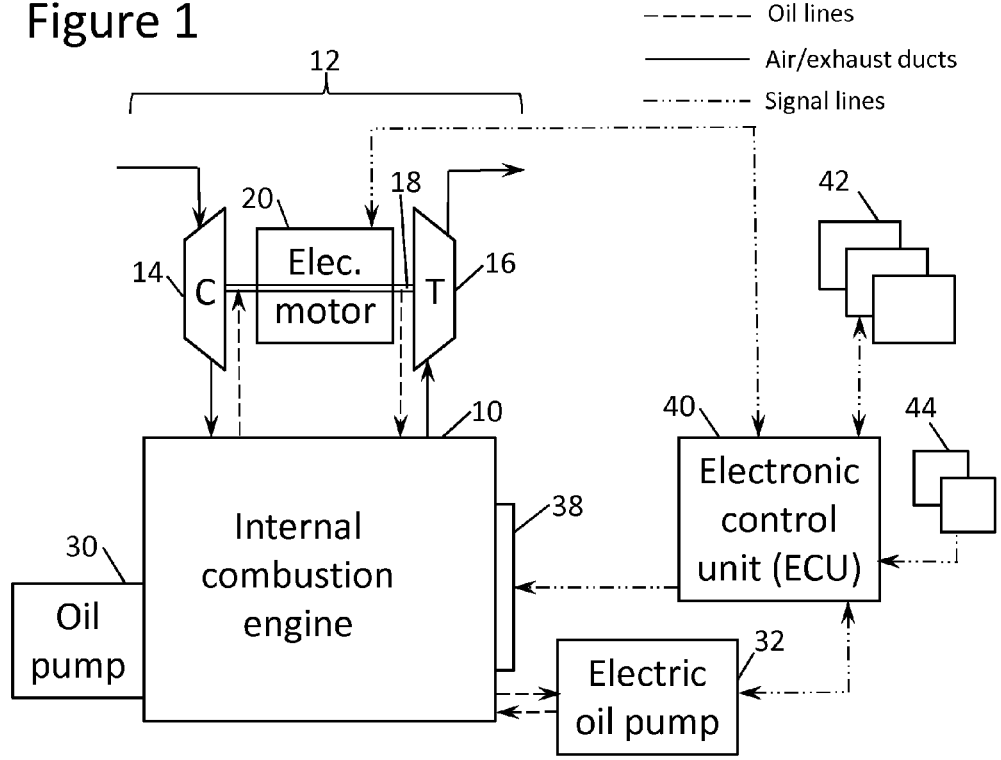
FIGS. 1 and 6 are schematic representations of an engine system having an ECT using an electric oil pump and an accumulator, respectively.
Figure 6:
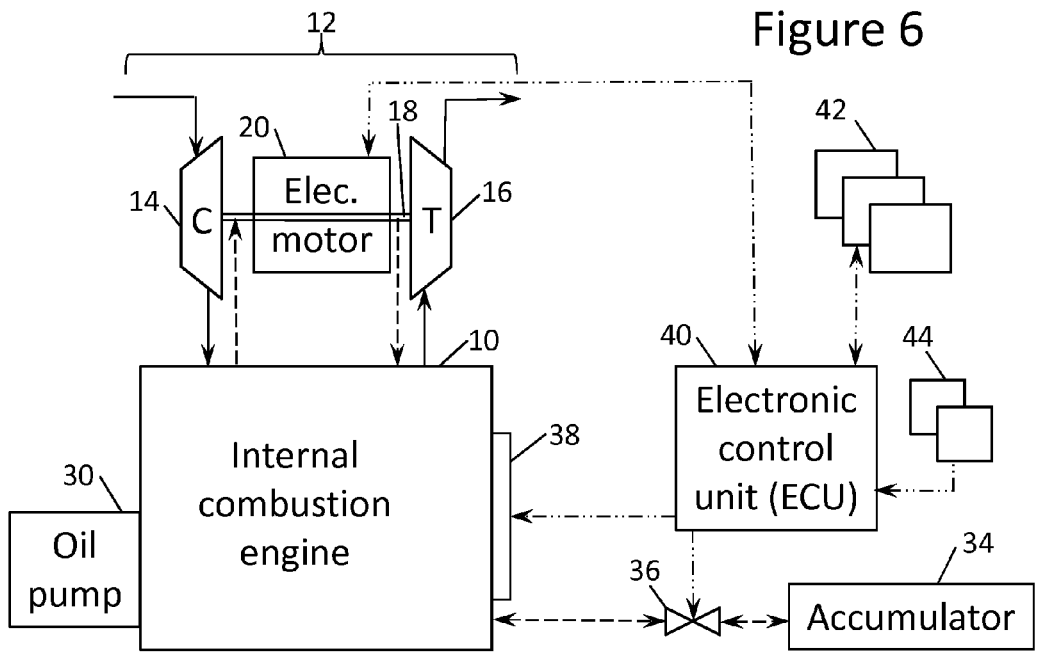

An internal combustion engine having an electronically controlled turbocharger (ECT) 12 is represented schematically in FIGS. 1 and 6. ECT 12 includes: a compressor 14 that compresses intake gases supplied to engine 10; a turbine 16 that extracts energy from exhaust gases from engine 10; a shaft 18 that couples compressor 14 with turbine 16; and an electric motor 20 that drives, or may be driven by, shaft 18.

Engine 10 has an engine-driven, mechanical oil pump 30 to lubricate and cool the engine as well as supplying oil to electric motor 20, bearings associated with ECT 12, and turbine 16. Oil lines are represented by dashed lines in FIG. 1. In the embodiment in FIG. 1, engine 10 also has an electric oil pump 32 provided in parallel with oil pump 30. Engine 10 is spun up via starter motor 38.

In the embodiment in FIG. 6, the oil circuit is coupled to a reservoir or oil accumulator 34 including a valve 36 between accumulator 34 and the oil circuit. Oil is stored in accumulator 34 when the pressure is raised in the oil circuit when valve 36 is open. When engine 10 is shutdown, valve 36 can be opened to cause oil to flow through engine 10 and ECT 12 to provide cooling during the hot soak. Accumulator 34 is typically unnecessary when an electric oil pump 32 is provided in the system, such as in the embodiment in FIG. 1, as the electric oil pump 32 can be commanded to continue to provide oil flow through engine 10 and ECT 12 well after shutdown.

In FIGS. 1 and 6, electronic connections are illustrated as well by dash-dot-dot lines. An electronic control unit (ECU) 40 may receive signals, such as temperature and speed, and send control signals to electric motor 20. The schematic illustrations shown in FIGS. 1 and 6 are simplistic in that they do not show a power source, e.g., a battery, and power electronics to drive the various devices. Only the signal connections are illustrated. ECU 40 is electronically coupled to various sensors and actuators 42. Such sensors may be speed, temperature, pressure, and mass flow sensors, as examples. Actuators may include valves, such as throttle and EGR, and fuel injector drivers, as examples. ECU 40 is also electronically coupled to input devices 44 which may include a driver-operated accelerator pedal, or alternatively input from an autonomous controller.

Based on inputs, ECU 40 controls at least: electric motor 20, electric oil pump 32, and starter motor 38, according to the embodiment in FIG. 1; and controls at least electric motor 20, starter motor 38, and valve 36 to accumulator 34, according to the embodiment in FIG. 6.

Figure 2:
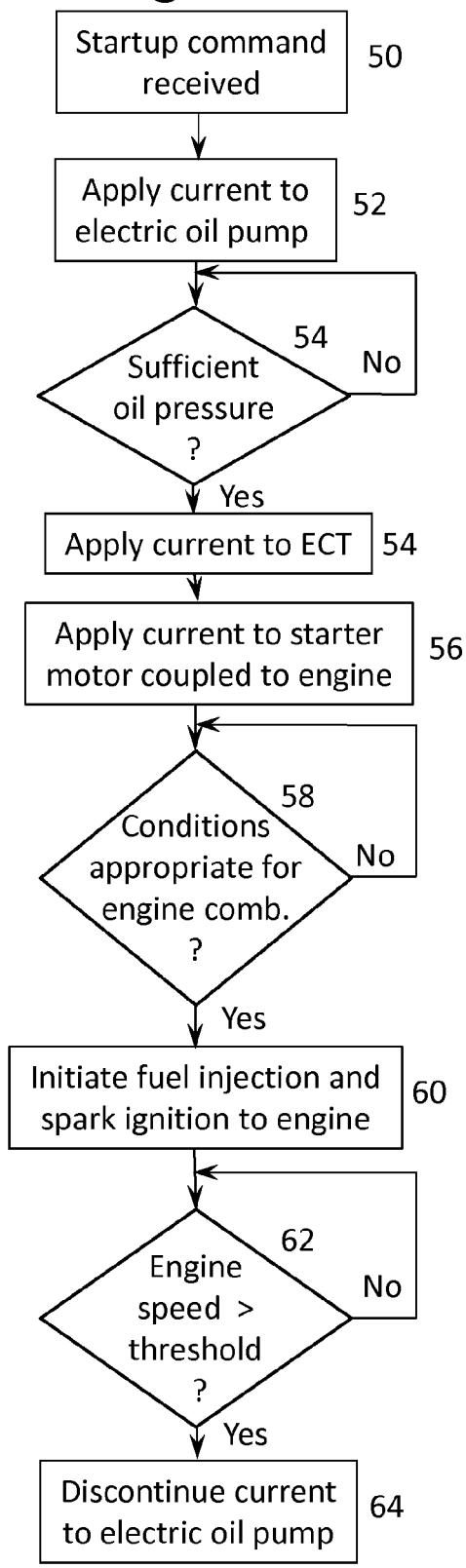
FIG. 2 is a flowchart depicting an embodiment of a startup sequence in an engine configuration having an electric oil pump.
Figure 3:
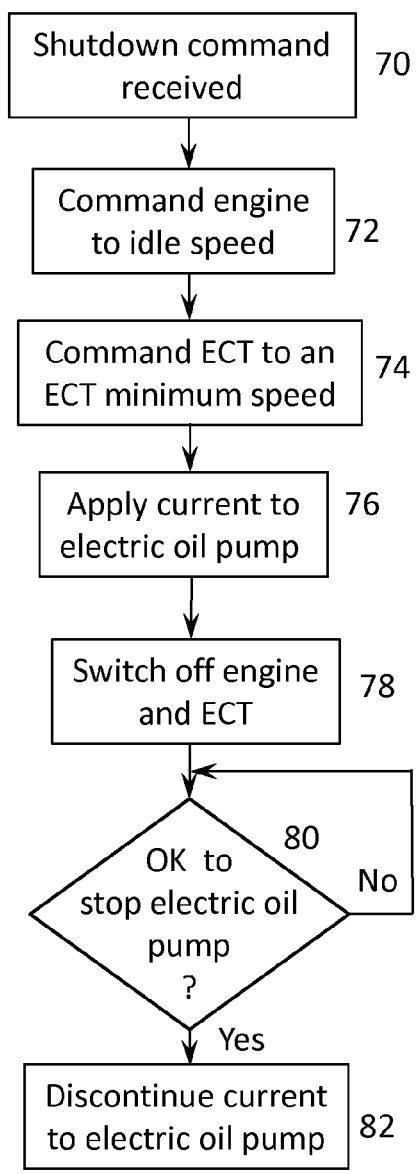
FIG. 3 is a flowchart depicting an embodiment of a shutdown sequence in an engine configuration having an electric oil pump.

In an embodiment relevant to FIGS. 2 and 3, electric pump 32 is included in the configuration with no valve 36 or accumulator 34. A startup routine for such a configuration is shown in FIG. 2. A startup command 50 initiates the sequence. Startup command 50 could be a turn of an ignition key by a vehicle operator or a restart of an engine in a hybrid electric vehicle commanded by ECU 40 as non-limiting examples. Current is applied to electric oil pump in block 52. Control passes to block 54 to determine if the pressure is sufficient. Sufficient pressure, in one embodiment, is based on a pressure sensor provided at a location in the oil circuit. Alternatively, the oil pump is operated for a period of time estimated to be sufficient to develop the desired pressure. In yet another alternative, the current draw and speed of the electric oil pump are used to estimate the pressure. Any other suitable estimation of oil pressure may be used. When oil pressure is sufficient, current is applied to the ECT and to the starter motor of the engine, in blocks 54 and 56. These can be accomplished simultaneously, in the order shown in FIG. 2, or with block 56 preceding block 54. In yet another alternative, the oil pressure threshold for activating the ECT is different than that for rotating the engine. In some embodiments, current is applied to the ECT to cause it to rotate at a lower desired threshold speed. Control passes to block 58 in which it is determined whether the appropriate conditions for initiating engine combustion exist. The appropriate conditions support ignition of injected fuel. This may be detected based on one or more of engine speed, pressure ratio across the compressor, intake pressure, intake temperature, and possibly others, such as fuel injection properties. When conditions are appropriate, fuel injection is initiated, in block 60. If the engine is a spark ignition engine, spark is also initiated, block 60. Control passes to block 62 to determine if engine speed exceeds a threshold, essentially to determine whether the engine has properly started and the mechanical oil pump is providing sufficient oil supply. If so, the electric pump is stopped by turning off the current to the electric oil pump. In one embodiment, the mechanical pump has sufficient capacity to provide the desired level of oil during normal operation of the engine and the electric oil pump is not used. In an alternative embodiment, the electric oil pump is operated sporadically to supplement the mechanical pump, e.g., at low engine speed, high cooling requirements or other.

In FIG. 3, an example shutdown procedure is shown. In block 70, a shutdown command is received, e.g., based on a position of an ignition key or from a command from an ECU. The engine is commanded to idle speed in block 72. The ECT is commanded to the minimum ECT speed in block 74. Current is applied to the electric oil pump in block 76. Block 72, 74, and 76 may be accomplished simultaneously or in a different order. Control passes to block 78 in which the engine and the ECT are shut down, i.e., fuel supply is discontinued and current to the ECT is stopped. In block 80, it is determined whether is OK to stop the electric oil pump. This may be based on temperature in the ECT. This can be based on a model of temperature in the ECT or temperature sensors. When determine that it is OK to do so, current to the electric oil pump is discontinued in block 82.

Figure 4:
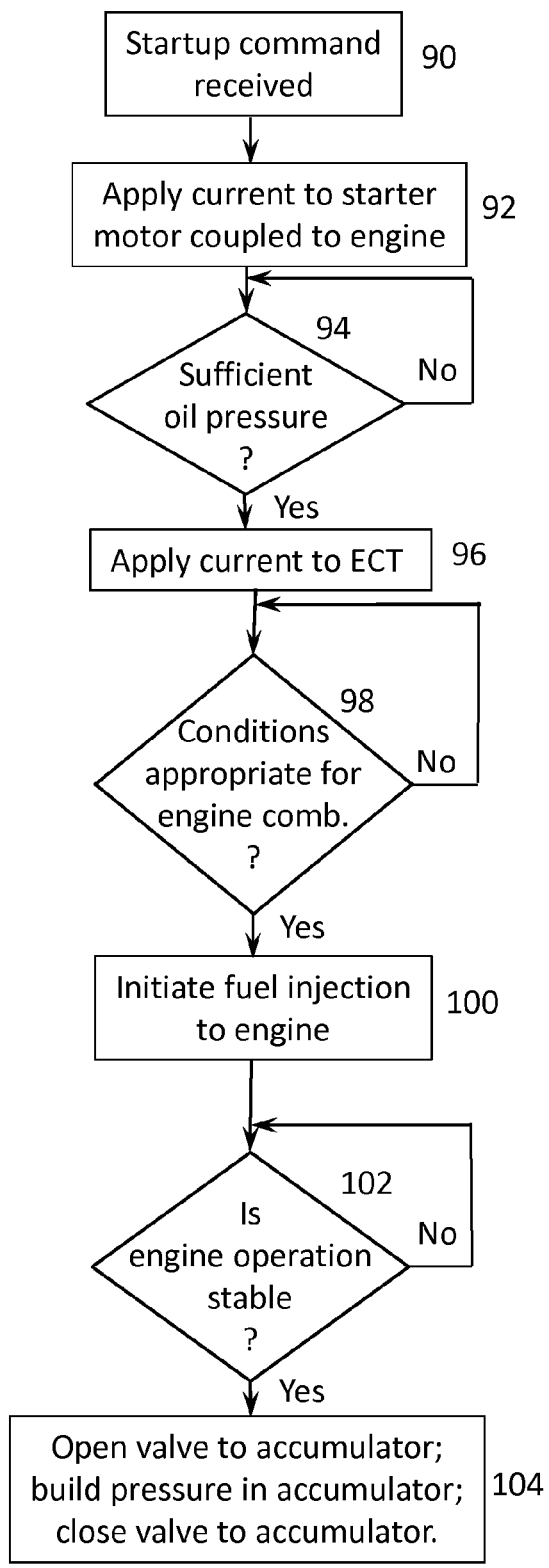
FIG. 4 is a flowchart depicting an embodiment of a startup sequence in an engine configuration having an oil accumulator.
Figure 5:
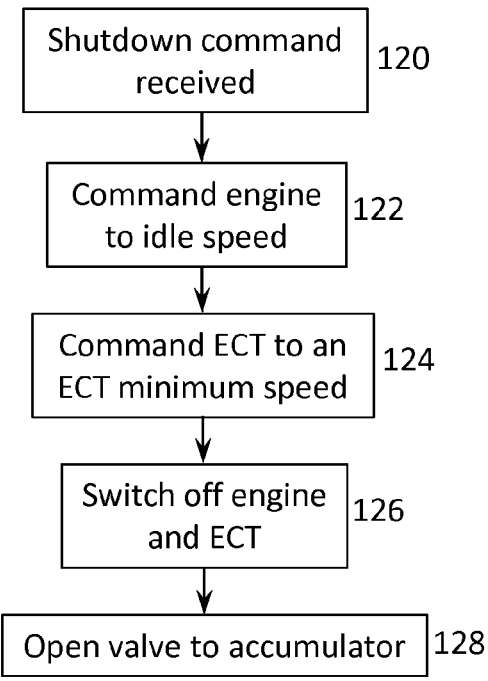
FIG. 5 is a flowchart depicting an embodiment of a shutdown sequence in an engine configuration having an oil accumulator.

In an alternative embodiment, an electric oil pump is not included; but, the system includes the accumulator coupled via the valve to the oil circuit. FIGS. 4 and 5 apply to such a configuration. Beginning in block 90, a starting command is received. Control passes to block 92 in which a starter motor coupled to the engine is energized. In block 94, it is determined whether there is sufficient oil pressure to spin up ECT 96. If so, control passes to block 96. In block 98, it is determined whether the conditions are suitable to start the engine (analogous to block 58 in FIG. 2). If so, fuel injection, and spark ignition if applicable, is initiated in block 100. In block 102, it is determined whether the engine is operating stably. If so, the valve to the accumulator is opened to build up pressure in the accumulator in block 104. When the pressure is raised in the accumulator, the valve is closed. The accumulator can be provided oil as soon as the oil pressure rises due to normal operation of the engine. In another alternative, the accumulator is provided the higher pressure oil just before shutdown. The accumulator can be charged at any suitable time during the engine cycle.

In FIG. 5, a shutdown procedure begins in block 120 when the shutdown command is received. The engine is commanded to idle in block 122 and ECT to a minimum ECT speed in block 124. The engine and ECT are switched off in block 126, meaning that fuel and/or spark are switched off to the engine and current is no longer provided to the ECT. In block 128, the valve to accumulator is opened to allow flow through the oil circuit to provide continued cooling after the oil pump has stopped.

In yet another configuration of the engine, no electric oil pump and no accumulator are provided. In FIG. 4, a startup procedure is illustrated starting in block 90 in which the procedure is initiated upon receipt of a startup command. Current is provided to the starter motor in block 92. In block 94, it is determined whether sufficient oil pressure has been achieved prior to passing control to block 96 in which current is applied to the ECT. In decision block 98, it is determined whether the conditions in the engine are appropriate for engine combustion. That is, are the estimated pressures and temperatures in the engine sufficient and/or is the fuel injection pressure sufficient and/or is the engine speed sufficient to support engine combustion. If so, fuel injection is initiated in block 100. Control passes to decision block 102 to determine whether the engine operation is stable. If so, control passes to block 104 in which the valve to the accumulator is opened to build up pressure in the accumulator. Then, the valve to the accumulator is closed. Block 104 illustrates one example embodiment for charging the accumulator with pressurized oil. In one alternative, the accumulator is charged well after the engine merely attains stable operation. As the pressurized oil in the accumulator is provided to cool the ECT upon shutdown, in one embodiment, the accumulator is not charged until it is determined that the engine/ECT has operated long enough that it is desirable to cool the ECT upon shutdown. For brief running periods, such cooling is unnecessary. In yet another embodiment, the accumulator is charged just before engine shutdown. The later the accumulator is charged, the less concern for pressure degradation due to leakage.

In FIG. 5, a shutdown procedure starts in block 120 with the receipt of a shutdown command. Control passes to blocks 122 and 124 in which the engine is commanded to idle speed and the ECT is commanded to an ECT minimum speed, respectively. The engine and the ECT are shut off in block 126. In block 128 the valve between the accumulator and the oil circuit is open to allow oil to flow to the engine and the ECT to provide cooling. A series of mechanical valves prevents the backflow of oil. In one alternative, the charging of the accumulator, block 104 of FIG. 4, is part of the shutdown procedure and is part of FIG. 5, included between blocks 120 and 122.

The flowcharts in FIGS. 2-5 provide a non-limiting example embodiment. For example, various blocks can be rearranged, eliminated, and/or expanded upon and still be within the scope of the present disclosure.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A method to control an engine having an electronically-controlled turbocharger (ECT), comprising:
   applying current to an electric oil pump supplying oil to an oil circuit of the engine and the ECT in response to receipt of a startup comment of the engine;
   applying current to the ECT when oil pressure in the oil circuit is estimated to exceed a first threshold pressure;
   applying current to a starter motor coupled to the engine when oil pressure in the oil circuit is estimated to exceed a second threshold pressure; and
   initiating fuel injection to the engine in response to a determination that at least one condition is appropriate for engine combustion;
   commanding the ECT to an ECT minimum speed in response to receiving a command to shutdown the engine;
   applying current to the electric oil pump in response to receiving the command to shutdown the engine; and
   shutting off the engine and the ECT after current has been applied to the electric oil pump.

2. The method of claim 1 wherein the first and second threshold pressures are the same.

3. The method of claim 1 wherein the appropriate condition at least partially comprises pressure in an intake of the engine exceeding a predetermined pressure.

4. The method of claim 1 wherein the appropriate condition at least partially comprises a speed of the ECT exceeding a predetermined speed.

5. The method of claim 1, further comprising: discontinuing current supply to the electric oil pump when one of: combustion has been initiated in the engine or engine speed has exceeded a threshold speed 6. The method of claim 1, further comprising: initiating spark ignition concurrently with initiating fuel injection.

7. The method of claim 1, further comprising:
   commanding the engine to an idle speed in response to receiving shutdown command.

8. The method of claim 1 wherein the first threshold pressure is less than the second threshold pressure.

9. A method to control an engine having an electronically-controlled turbocharger (ECT), comprising:
   applying current to an electric oil pump supplying oil to an oil circuit of the engine and the ECT;
   applying current to the ECT when oil pressure in the oil circuit is estimated to exceed a startup threshold pressure; and
   applying current to a starter motor coupled to the engine; and
   initiating fuel injection to the engine after applying current to ECT and after applying current to the starter motor;
   commanding the engine to idle speed in response too receiving a command to shutdown the engine;
   commanding the ECT to an ECT minimum speed in response to receiving a command to shutdown the engine;

applying current to the electric oil pump in response to receiving a command to shutdown the engine; and switching off the engine and the ECT after current has been applied to the electric oil pump.

10. The method of claim 9, further comprising: discontinuing current to the electric oil pump based on an engine parameter exceeding an engine parameter threshold.

11. The method of claim 9, further comprising: commanding the electric oil pump to stop based on a temperature in the ECT.

12. A method to control an engine having an electronically-controlled turbocharger (ECT), comprising:

commanding the ECT to an ECT minimum speed in response to receiving a command to shutdown the engine;

applying current to the electric oil pump in response to receiving the command to shutdown the engine; and commanding the engine and the ECT to shut down after current has been applied to the electric oil pump in response to the command to shutdown the engine.

13. The method of claim 12, further comprising:

applying current to an electric oil pump supplying oil to an oil circuit of the engine and the ECT in response to receipt of a startup command of the engine;

applying current to the ECT when oil pressure in the oil circuit is estimated to exceed a first threshold pressure; and applying current to a starter motor coupled to the engine when oil pressure in the oil circuit is estimated to exceed a second threshold pressure.

14. The method of claim 13, further comprising: discontinuing current supply to the electric oil pump when engine speed has exceeded a threshold speed.

15. The method of claim 13, further comprising: discontinuing current supply to the electric oil pump when combustion is established in the engine.

16. The method of claim 12, further comprising: commanding the engine to idle speed in response to receiving the command to shutdown the engine.

17. The method of claim 12, further comprising: commanding the electric oil pump to stop after engine startup based on a temperature in the ECT.

* * * * *